United States Patent
Yoshida et al.

(10) Patent No.: US 8,945,766 B2
(45) Date of Patent: Feb. 3, 2015

(54) ALL-SOLID SECONDARY BATTERY WITH GRADED ELECTRODES

(75) Inventors: Satoshi Yoshida, Toyota (JP); Takayoshi Doi, Toyota (JP); Yukiyoshi Ueno, Gotenba (JP); Tenmei Nisino, Suntou-gun (JP); Yasushi Tsuchida, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 746 days.

(21) Appl. No.: 13/254,740

(22) PCT Filed: Mar. 15, 2010

(86) PCT No.: PCT/IB2010/000529
§ 371 (c)(1),
(2), (4) Date: Sep. 2, 2011

(87) PCT Pub. No.: WO2010/106412
PCT Pub. Date: Sep. 23, 2010

(65) Prior Publication Data
US 2012/0052382 A1  Mar. 1, 2012

(30) Foreign Application Priority Data

Mar. 16, 2009 (JP) ................................. 2009-062703
Dec. 4, 2009 (JP) ................................. 2009-276698

(51) Int. Cl.
H01M 10/0562 (2010.01)
H01M 10/0525 (2010.01)
H01M 4/04 (2006.01)
H01M 4/139 (2010.01)
H01M 4/02 (2006.01)

(52) U.S. Cl.
CPC ......... H01M 10/0525 (2013.01); H01M 4/043 (2013.01); H01M 4/139 (2013.01); H01M 4/02 (2013.01); H01M 2004/021 (2013.01); Y02E 60/122 (2013.01)
USPC ....................................................... 429/211

(58) Field of Classification Search
None
See application file for complete search history.

(56) References Cited

U.S. PATENT DOCUMENTS

2006/0251965 A1   11/2006   Nagayama et al.

FOREIGN PATENT DOCUMENTS

| JP | A-8-195219 | 7/1996 |
| JP | A-2006-210003 | 8/2006 |
| JP | B2-4055671 | 12/2007 |
| JP | A-2009-146657 | 7/2009 |

OTHER PUBLICATIONS

International Search Report mailed Jul. 14, 2010 issued in International Patent Application No. PCT/IB2010/000529.
Written Opinion of the International Searching Authority mailed Jul. 14, 2010 issued in International Patent Application No. PCT/IB2010/000529.

*Primary Examiner* — Patrick Ryan
*Assistant Examiner* — Wyatt McConnell
(74) *Attorney, Agent, or Firm* — Oliff PLC (57) ABSTRACT

In an all-solid secondary battery, in an electrode active material layer of at least one of positive and negative electrode bodies, a total content ratio, which is represented by a ratio of mass of an electrolyte contained in the electrode active material layer to mass of an active material contained in the electrode active material layer, is larger than 1; and the electrode active material layer of the at least one of the positive and negative electrode bodies has a composition distribution in which a local content ratio, which is represented by a ratio of mass of the electrolyte contained in a portion of the electrode active material layer to mass of the active material contained in the portion of the electrode active material layer, increases from a solid electrolyte interface toward a current collector interface in a thickness direction of the electrode active material layer.

12 Claims, 7 Drawing Sheets

ALL-SOLID SECONDARY BATTERY WITH GRADED ELECTRODES

BACKGROUND OF THE INVENTION

1. Field of the Invention

The invention relates to an all-solid secondary battery that is excellent in reducing an overpotential, reducing the possibility that an electrode active material layer expands and contracts, and reducing the possibility that a conductive path and a metal ion conduction path are interrupted.

2. Description of the Related Art

In a secondary battery, a portion of chemical energy is converted to electric energy due to a chemical reaction. Thus, electricity is discharged from the secondary battery. In addition, when current flows in a direction opposite to a direction in which current flows at the time of electric discharge, electric energy is converted to chemical energy, and stored in the secondary battery (that is, the secondary battery is charged). Among secondary batteries, a lithium secondary battery is widely employed as power sources of, for example, a notebook-sized personal computer and a cellular phone, because the lithium secondary battery has high energy density.

In the lithium secondary battery, when graphite ($C_6$) is used as a negative electrode active material, a reaction represented by a formula (1) proceeds at a negative electrode at the time of electric discharge.

$$C_6Li \rightarrow C_6 + Li^+ + e^- \quad (1)$$

Electrons generated in the formula (1) flow through an external circuit, and perform work on an external load, and then, reaches a positive electrode. Lithium ions ($Li^+$) generated in the formula (1) move in an electrolyte held between the negative electrode and the positive electrode, from the negative electrode to the positive electrode due to electro-osmosis.

When lithium cobaltate ($Li_{0.4}CoO_2$) is used as the positive electrode active material, a reaction represented by a formula (2) proceeds at the positive electrode at the time of electric discharge.

$$Li_{0.4}CoO_2 + 0.6Li^+ + 0.6e^- \rightarrow LiCoO_2 \quad (2)$$

At the time of electric charge, a reverse reaction opposite to the reaction represented by the formula (1) proceeds at the negative electrode, and a reverse reaction opposite to the reaction represented by the formula (2) proceeds at the positive electrode. At the negative electrode, the graphite ($C_6Li$), into which the lithium ions have moved due to graphite intercalation, is recovered. At the positive electrode, lithium cobaltate ($Li_{0.4}CoO_2$) is recovered. Thus, the lithium secondary battery is able to discharge.

In the lithium secondary battery, the electrode, into which the electrolyte has been mixed, is generally used to increase mobility of the lithium ions. Particularly, when using the electrode into which a solid electrolyte has been mixed, the electrolyte does not permeate pores in the electrode, and therefore, an ion conduction path, through which ions move, may be interrupted depending on a mixing ratio between the solid electrolyte and the active material in the electrode. Accordingly, the impedance of the electrode may increase. As a result, it may become difficult to charge the secondary battery with large current, and to discharge large current from the secondary battery, and thus, the rate of utilization of the active material may decrease.

Technologies for avoiding the above-described situation when employing the solid electrolyte have been developed. Japanese Patent Application Publication No. 8-195219 (JP-A-8-195219) describes an all-solid lithium secondary battery that includes a positive electrode, a negative electrode, and a solid electrolyte. In the all-solid lithium secondary battery, a mixture, which is produced by mixing active material powder with a given average particle diameter and solid electrolyte powder with a given average particle diameter at a certain weight ratio, is used as at least one of the electrodes.

As shown by the above-described formulae (1) and (2), in the lithium secondary battery, the lithium ions move between the positive electrode and the negative electrode due to electric charge and electric discharge. Conventionally, the positive electrode and the negative electrode alternately expand and contract, because the lithium ions move into, and move out of the positive electrode and the negative electrode. As a result, the battery may be warped or deformed, or a crack may occur in the battery. For example, Japanese Patent Application Publication No. 2009-146657 (JP-A-2009-146657) describes a technology for avoiding the above-described situation, that is, a solid electrolyte lithium secondary battery in which a positive electrode, a solid electrolyte layer, and a negative electrode current collector are sequentially stacked. In the positive electrode, a positive electrode composite layer, which contains positive electrode active material powder and solid electrolyte powder, is formed on each of both surfaces of a positive electrode current collector in the form of a flat plate.

In the technology described in the publication No. 8-195219, the mixing ratio between the active material and the solid electrolyte is optimized. However, no consideration is given to the distribution of the mobility of the ions in the electrode. Also, in the solid electrolyte lithium secondary battery described in the publication No. 2009-146657, a space is actually provided in advance so that the secondary battery can be expanded at the time of electric charge, as shown in FIG. 1 of the publication. Therefore, the technology cannot radically reduce the possibility that, for example, the battery is warped.

SUMMARY OF THE INVENTION

The invention provides an all-solid secondary battery that is excellent in reducing an overpotential, reducing the possibility that an electrode active material layer expands and contracts, and reducing the possibility that a conductive path and a metal ion conduction path are interrupted.

A first aspect of the invention relates to an all-solid secondary battery. The all-solid secondary battery includes a positive electrode body including a positive electrode current collector and a positive electrode active material layer that contains at least a positive electrode active material and a positive electrode electrolyte, and that is formed on the positive electrode current collector; a negative electrode body including a negative electrode current collector and a negative electrode active material layer that contains at least a negative electrode active material and a negative electrode electrolyte, and that is formed on the negative electrode current collector; and a solid electrolyte that is held between the positive electrode body and the negative electrode body. In the electrode active material layer of at least one of the positive electrode body and the negative electrode body, a total content ratio, which is represented by a ratio ($W_e/W_a$) of mass ($W_e$) of the electrolyte contained in the electrode active material layer to mass ($W_a$) of the active material contained in the electrode active material layer, is larger than 1 ($1 < W_e/W_a$); and the electrode active material layer of the at least one of the positive electrode body and the negative electrode body has a composition distribution in which a local content ratio, which is represented by a ratio ($W_e$ (partial)/$W_a$ (partial)) of mass ($W_e$ (partial)) of the electrolyte contained in a portion of the electrode active material layer to mass ($W_a$ (partial)) of the active material contained in the portion of the electrode active material layer, increases from a solid electrolyte interface toward a current collector interface in a thickness direction of the electrode active material layer.

In the all-solid secondary battery with this configuration, it is possible to ensure sufficient movement of metal ions in the electrolyte in the electrode active material layer at a portion in the vicinity of at least one of the positive electrode current collector and the negative electrode current collector. This decreases the resistance of the entire battery, and increases energy density.

In the all-solid secondary battery according to the first aspect of the invention, in at least the positive electrode active material layer of the positive electrode body, the total content ratio may be larger than 1, and at least the positive electrode active material layer may have the composition distribution in which the local content ratio increases from the solid electrolyte interface toward the current collector interface in the thickness direction of the electrode active material layer.

In the all-solid secondary battery with this configuration, it is possible to ensure sufficient movement of metal ions in the electrolyte in the electrode active material layer at a portion in the vicinity of the positive electrode current collector. This decreases the resistance of the entire battery, and increases energy density.

A second aspect of the invention relates to an all-solid secondary battery. The all-solid secondary battery includes a positive electrode body including a positive electrode current collector and a positive electrode active material layer that contains at least a positive electrode active material and a positive electrode electrolyte, and that is formed on the positive electrode current collector; a negative electrode body including a negative electrode current collector and a negative electrode active material layer that contains at least a negative electrode active material and a negative electrode electrolyte, and that is formed on the negative electrode current collector; and a solid electrolyte that is held between the positive electrode body and the negative electrode body. The electrode active material layer of at least one of the positive electrode body and the negative electrode body has a composition distribution in which a local content ratio, which is represented by a ratio ($V_e$ (partial)/$V_a$ (partial)) of a volume ($V_e$ (partial)) of the electrolyte contained in a portion of the electrode active material layer to a volume ($V_a$ (partial)) of the active material contained in the portion of the electrode active material layer, increases from a solid electrolyte interface toward a current collector interface in a thickness direction of the electrode active material layer.

In the all-solid secondary battery with this configuration, when the thickness of the electrode active material layer is increased to improve a high-rate discharge characteristic, it is possible to reduce the possibility that the proportion of active material particles connected from the current collector interface decreases, and to reduce the possibility that the proportion of electrolyte particles connected from the solid electrolyte interface decreases. Accordingly, it is possible to reduce the possibility that a conductive path is interrupted, and to reduce the possibility that a metal ion conduction path is interrupted.

In the all-solid secondary battery according to the second aspect of the invention, at least the positive electrode active material layer of the positive electrode body may have the composition distribution in which the local content ratio increases from the solid electrolyte interface toward the current collector interface in the thickness direction of the electrode active material layer.

In the all-solid secondary battery according to the second aspect of the invention, in the electrode active material layer of at least one of the positive electrode body and the negative electrode body, a porosity may increase from the current collector interface toward the solid electrolyte interface in the thickness direction of the electrode active material layer.

In the all-solid secondary battery with this configuration, pores absorb expansion and contraction of the active material due to movement of metal ions. The expansion and contraction of the active material are prominent particularly in the solid electrolyte interface side.

In the all-solid secondary battery according to the second aspect of the invention, in at least the positive electrode active material layer of the positive electrode body, the porosity may increase from the current collector interface toward the solid electrolyte interface in the thickness direction of the electrode active material layer.

In the all-solid secondary battery according to the second aspect of the invention, in at least the positive electrode active material layer of the positive electrode body, the porosity may be 0.05% to 40%.

In the all-solid secondary battery according to the second aspect of the invention, a thickness of the electrode active material layer of at least one of the positive electrode body and the negative electrode body may be 1 to 300 µm.

In the all-solid secondary battery according to the second aspect of the invention, a thickness of the electrode active material layer of at least one of the positive electrode body and the negative electrode body may be 20 to 200 µm. A thickness of at least the positive electrode active material layer of the positive electrode body may be 1 to 300 µm. A thickness of at least the positive electrode active material layer of the positive electrode body may be 20 to 200 µm.

In the all-solid secondary battery according to the second aspect of the invention, the solid electrolyte may include a compact formed by pressing powder.

According to the above-described aspects of the invention, it is possible to ensure sufficient movement of metal ions in the electrolyte in the electrode active material layer at a portion in the vicinity of at least one of the positive electrode current collector and the negative electrode current collector. This decreases the resistance of the entire battery, and increases energy density.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

A first all-solid secondary battery and a second all-solid secondary battery according to the invention have a common technical feature that a ratio between an active material and an electrolyte contained in an electrode active material layer varies in a thickness direction of the electrode active material layer. The first all-solid secondary battery is different from the second all-solid secondary battery in that a mass ratio between the active material and the electrolyte varies in the first all-solid secondary battery, and a volume ratio between the active material and the electrolyte varies in the second all-solid secondary battery. Hereinafter, the first and second all-solid secondary batteries will be described.

1. First All-Solid Secondary Battery

The first all-solid secondary battery according to the invention includes a positive electrode body including a positive electrode current collector and a positive electrode active material layer that contains at least a positive electrode active material and a positive electrode electrolyte, and that is formed on the positive electrode current collector; and a negative electrode body including a negative electrode current collector and a negative electrode active material layer that contains at least a negative electrode active material and a negative electrode electrolyte, and that is formed on the negative electrode current collector; and a solid electrolyte that is held between the positive electrode body and the negative electrode body. In the electrode active material layer of at least one of the positive electrode body and the negative electrode body, a total content ratio, which is represented by a ratio ($W_e/W_a$) of mass ($W_e$) of the electrolyte contained in the electrode active material layer to mass ($W_a$) of the active material contained in the electrode active material layer, is larger than 1 ($1 < W_e/W_a$); and the electrode active material layer of the at least one of the positive electrode body and the negative electrode body has a composition distribution in which a local content ratio, which is represented by a ratio ($W_e$ (partial)/$W_a$ (partial)) of mass ($W_e$ (partial)) of the electrolyte contained in a portion of the electrode active material layer to mass ($W_a$ (partial)) of the active material contained in the portion of the electrode active material layer, increases from a solid electrolyte interface toward a current collector interface in the thickness direction of the electrode active material layer. The solid electrolyte interface is an interface between the electrode active material layer and the solid electrolyte. The current collector interface is an interface between the electrode active material layer and the current collector.

In the first all-solid secondary battery according to an embodiment of the invention, in at least the positive electrode active material layer of the positive electrode body, the above-described total content ratio ($W_e/W_a$) is larger than 1; and at least the positive electrode active material layer has the composition distribution in which the local content ratio ($W_e$ (partial)/$W_a$ (partial)) increases from the solid electrolyte interface toward the current collector interface in the thickness direction.

In the invention, "the all-solid secondary battery" signifies a secondary battery in which all components are solids. Accordingly, the invention does not include, for example, a secondary battery in which a liquid electrolyte is used as the electrolyte. The "solid electrolyte" according to the invention includes both of an organic electrolyte and inorganic electrolyte. In this case, the organic electrolyte includes not only a polymer electrolyte, but also a gel electrolyte. The "composition distribution in which the local content ratio increases from the solid electrolyte interface toward the current collector interface" according to the invention will be described more specifically. When the local content ratios at two different portions of the electrode active material layer are compared to each other, the local content ratio at one of the two portions, which is closer to the current collector than the other portion is, is larger than the local content ratio at the other portion that is closer to the solid electrolyte than the one portion is. In this case, the local content ratio may continuously increase, for example, the local content ratio may increase in an inclined manner or may linearly increase. Also, the local content ratio may intermittently increase, for example, the local content ratio may increase in a stepwise manner.

Figure 7:
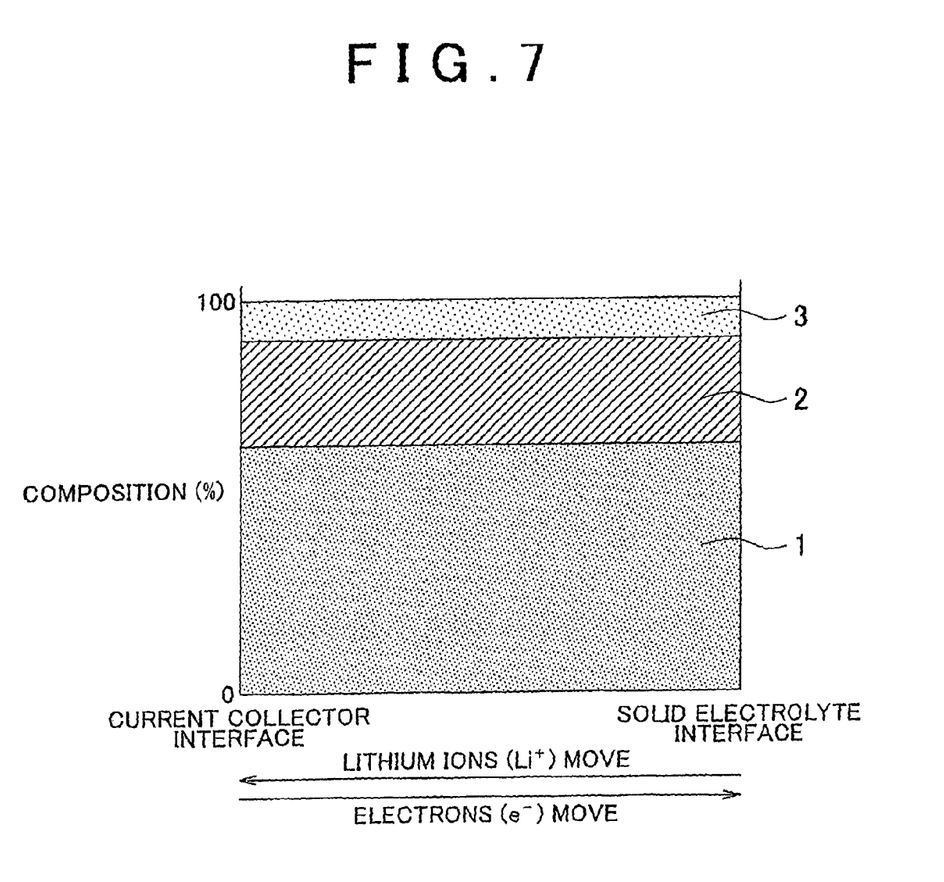
FIG. 7 is a graph schematically showing proportions of the amount of an electrolyte, the amount of an active material, and the amount of a conductive auxiliary agent contained in a lithium secondary battery in related art.

FIG. 7 is a graph schematically showing proportions of the amount of a positive electrode electrolyte, the amount of a positive electrode active material, and the amount of a conductive auxiliary agent in a lithium secondary battery in related art, for example, related art described in Japanese Patent Application Publication No. 8-195219 (JP-A-8-195219). An ordinate axis of the graph indicates a composition ratio in a manner such that the total of the amount of the positive electrode electrolyte, the amount of the active material, and the amount of the conductive auxiliary agent is equal to 100% at any portion in the positive electrode active material layer. An abscissa axis of the graph indicates a position in the positive electrode active material layer. A left end of the graph indicates the proportions of the amounts at the interface at which the electrode contacts the current collector. The proportions of the amounts at a position in the electrode farther from the current collector is indicated by a position in the graph farther from the left end of the graph, i.e., a position in the graph closer to the right end of the graph. A right end of the graph indicates the proportions of the amounts at the interface at which the electrode contacts the solid electrolyte. In the electrode, lithium ions move in a direction from the interface at which the electrode active material layer contacts the solid electrolyte, toward the interface at which the electrode active material layer contacts the current collector, that is, in a direction toward the left side in the graph. Also, in the electrode, electrons move in a direction from the interface at which the electrode active material layer contacts the current collector, toward the interface at which the electrode active material layer contacts the solid electrolyte, that is, in a direction toward the right side in the graph. The graph simply indicates changes in the composition ratio among the positive electrode electrolyte, the active material, and the conductive auxiliary agent in the thickness direction. That is, the positive electrode electrolyte, the active material, and the conductive auxiliary agent are not necessarily disposed in the order shown in the graph. As shown in FIG. 7, in the positive electrode active material layer of the lithium secondary batter in related art, the positive electrode electrolyte 1, the positive electrode active material 2, and the conductive auxiliary agent 3 are uniformly (homogenously) disposed in the positive electrode active material layer. However, in general, the amount of movement of the lithium ions is constantly large at a position close to the solid electrolyte, and the amount of movement of the lithium ions decreases toward the current collector. Thus, in the positive electrode active material layer of the lithium secondary battery in related art, a difference is caused between the concentration distribution of the lithium ions that move, and the concentration distribution of the electrolyte that is the conductive medium. Thus, an average movement distance of the lithium ions increases, and accordingly, an overpotential increases. This phenomenon occurs more significantly when the solid electrolyte with high resistance is used. Also, this phenomenon occurs not only in the positive electrode active material layer, but also in the negative electrode active material layer.

Figure 1:
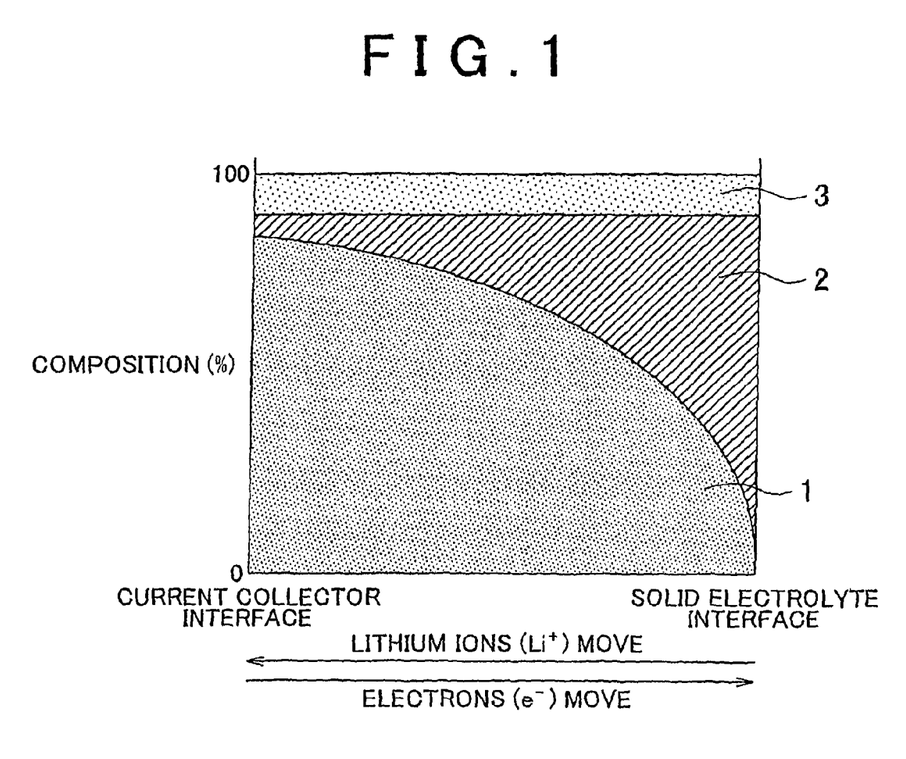
FIG. 1 is a graph schematically showing proportions of the amount of an electrolyte, the amount of an active material, and the amount of a conductive auxiliary agent contained in a typical example of a positive electrode active material layer of a first all-solid secondary battery according to the invention.

FIG. 1 is a graph schematically showing proportions of the amount of the positive electrode electrolyte, the amount of the active material, and the amount of the conductive auxiliary agent in a typical example of the positive electrode active material layer of the first all-solid secondary battery according to the invention. The ordinate axis indicates the composition ratio, and the abscissa axis indicates a position in the positive electrode active material layer, as in FIG. 7. As shown in FIG. 1, in the typical example of the positive electrode active material layer of the first all-solid secondary battery according to the invention, the total content ratio, which is represented by the ratio ($W_e/W_a$) of the mass ($W_e$: an area indicated by the reference numeral 1 in FIG. 1) of all the positive electrode electrolyte 1 in the positive electrode active material layer to the mass ($W_a$: an area indicated by the reference numeral 2 in FIG. 1) of all the positive electrode active material in the positive electrode active material layer, is larger than 1 ($1<W_e/W_a$). In addition, the typical example of the positive electrode active material layer has the composition distribution in which the local content ratio, which is represented by the ratio ($W_e$ (partial)/$W_a$ (partial)) of the mass ($W_e$ (partial)) of the positive electrode electrolyte contained in a portion of the positive electrode active material layer to the mass ($W_a$ (partial)) of the positive electrode active material contained in the portion of the positive electrode active material layer, increases from the solid electrolyte interface toward the current collector interface in the thickness direction of the positive electrode active material layer. Therefore, it is possible to ensure sufficient movement of metal ions in the electrolyte in the positive electrode active material layer at a portion in the vicinity of the positive electrode current collector. This decreases the average movement distance of the metal ions, and decreases the overpotential. Also, because the overpotential is reduced, the voltage is improved, and therefore, energy density of the secondary battery is improved. FIG. 1 shows an example in which the local content ratio continuously increases from the solid electrolyte interface toward the current collector interface in the thickness direction of the positive electrode active material layer. However, the invention is not limited to the example. For example, the local content ratio may increase in a stepwise manner. Also, portions in which the local content ratio continuously increases, and portions in which the local content ratio increases in a stepwise manner, may be alternately disposed. As shown in examples described later, it is known that in the case where the ratio $W_e/W_a$ is equal to or smaller than 1 ($W_e/W_a \leq 1$), that is, the mass of all the positive electrode electrolyte 1 in the positive electrode active material layer is equal to or smaller than the mass of all the positive electrode active material in the positive electrode active material layer (refer to first to six comparative examples, and FIG. 8 and FIG. 9), when the local content ratio ($W_e$ (partial)/$W_a$ (partial)) is set to vary in the thickness direction of the positive electrode active material layer, the overpotential is not reduced. Also, as shown in examples described later, in the case where the ratio $W_e/W_a$ is larger than 1 ($W_e/W_a>1$), that is, the mass of all the positive electrode electrolyte 1 in the positive electrode active material layer is larger than the mass of all the positive electrode active material in the positive electrode active material layer (refer to first to third examples, and FIG. 3), when the positive electrode active material layer has the composition distribution in which the proportion of the electrolyte at the current collector side is lower than 60%, that is, when the local content ratio ($W_e$ (partial)/$W_a$ (partial)) decreases from the solid electrolyte interface toward the current collector interface in the thickness direction of the positive electrode active material layer, the overpotential for lithium conduction is not minimized. This shows that when the amount of the active material disposed at the current collector side is larger than the amount of the active material disposed at the solid electrolyte side, diffusion of metal ions is not necessarily improved.

Figure 2:
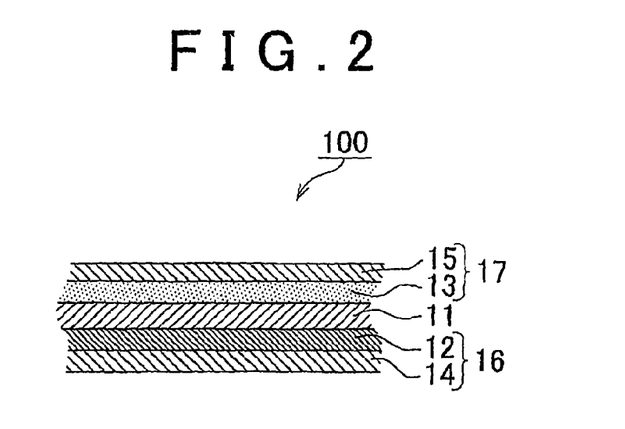
FIG. 2 is a diagram schematically showing a section of an example of the first all-solid secondary battery according to the invention, the section being taken along a stacking direction.

FIG. 2 is a diagram showing an example of the first all-solid secondary battery according to the invention. More specifically, FIG. 2 schematically shows a section taken along a stacking direction in which layers are stacked. The first all-solid secondary battery according to the invention is not necessarily limited to this example. An all-solid secondary battery 100 includes a positive electrode body 16 in which a positive electrode active material layer 12 and a positive electrode current collector 14 are stacked; a negative electrode body 17 in which a negative electrode active material layer 13 and a negative electrode current collector 15 are stacked; and a solid electrolyte 11 held between the positive electrode body 16 and the negative electrode body 17. Hereinafter, the positive electrode body, the negative electrode body, and the solid electrolyte, which are components of the first all-solid secondary battery according to the invention, and other components (for example, a separator) will be described.

1.1 Positive Electrode Body and Negative Electrode Body

The positive electrode body used in the invention includes the positive electrode current collector and the positive electrode active material layer that contains at least the positive electrode active material and the positive electrode electrolyte, and that is formed on the positive electrode current collector. The negative electrode body used in the invention includes the negative electrode current collector and the negative electrode active material layer that contains at least the negative electrode active material and the negative electrode electrolyte, and that is formed on the negative electrode current collector. In the first all-solid secondary battery according to the invention, in the electrode active material layer of at least one of the positive electrode body and the negative electrode body, the total content ratio, which is represented by the ratio ($W_e/W_a$) of the mass ($W_e$) of the electrolyte contained in the electrode active material layer to the mass ($W_a$) of the active material contained in the electrode active material layer, needs to be larger than 1 ($1<W_e/W_a$). Therefore, the technical scope of the invention does not include a case where the mass of all the positive electrode electrolyte in the positive electrode active material layer is equal to or smaller than the mass of all the positive electrode active material in the positive electrode active material layer, and the mass of all the negative electrode electrolyte in the negative electrode active material layer is equal to or smaller than the mass of all the negative electrode active material in the negative electrode active material layer. In the electrode active material layer of at least one of the positive electrode body and the negative electrode body, the total content ratio, which is represented by the ratio ($W_e/W_a$) of the mass ($W_e$) of the electrolyte contained in the electrode active material layer to the mass ($W_a$) of the active material contained in the electrode active material layer, is larger than 1 ($1 < W_e/W_a$); and the electrode active material layer of the at least one of the positive electrode body and the negative electrode body has the composition distribution in which the local content ratio, which is represented by the ratio ($W_e$ (partial)/$W_a$ (partial)) of the mass ($W_e$ (partial)) of the electrolyte contained in a portion of the electrode active material layer to the mass ($W_a$ (partial)) of the active material contained in the portion of the electrode active material layer, increases from the solid electrolyte interface toward the current collector interface in the thickness direction of the electrode active material layer.

The thickness of the positive electrode active material layer used in the invention varies according to applications for which the positive electrode active material layer is used, for example, the all-solid secondary battery. However, the thickness of the positive electrode active material layer is preferably in a range of 10 μm to 250 μm, more preferably in a range of 20 μm to 200 μm, and further more preferably in a range of 30 μm to 150 μm.

Examples of the positive electrode active material used in the invention include lithium compounds such as nickel cobalt lithium manganate ($LiNi_xCo_{1-x-y}Mn_yO_2$), lithium cobaltate ($LiCoO_2$), lithium nickelate ($LiNiO_2$), lithium manganate ($LiMnO_2$), iron olivine ($LiFePO_4$), cobalt olivine ($LiCoPO_4$), manganese olivine ($LiMnPO_4$), and lithium titanate ($Li_4Ti_5O_{12}$); and chalcogen compounds such as a copper chevrel compound ($Cu_2Mo_6S_8$), iron sulfide (FeS), cobalt sulfide (CoS), and nickel sulfide.

For example, the average particle diameter of the positive electrode active material is preferably in a range of 1 μm to 50 μm, more preferably in a range of 1 μm to 20 μm, and further more preferably in a range of 3 μm to 5 μm. If the average particle diameter of the positive electrode active material is extremely small, it may be difficult to treat the positive electrode active material. If the average particle diameter of the positive electrode active material is extremely large, it may be difficult to produce the flat positive electrode active material layer. The average particle diameter of the positive electrode active material is determined, for example, by measuring the diameters of particles of an active material carrier observed by a Scanning Electron Microscope (SEM), and averaging the diameters of the particles.

The positive electrode active material layer may contain, for example, a conducting material and a binding material, as required. The conducting material of the positive electrode active material layer used in the invention is not limited to a specific material, as long as the conducting material improves the conductive property of the positive electrode active material layer. Examples of the conducting material include carbon black such as acetylene black and ketjen black. The content of the conducting material in the positive electrode active material layer varies according to the kind of the conducting material. However, the content of the conducting material in the positive electrode active material layer is generally in a range of 1% by mass to 10% by mass.

Examples of the binding material of the positive electrode active material layer used in the invention include polyvinylidene fluoride (PVDF), and polytetrafluoroethylene (PTFE). The content of the binding material in the positive electrode active material layer may be set to any value, as long as the positive electrode active material and the like are immobilized by the binding material. A smaller amount of the binding material is more preferable. The content of the binding material is generally in a range of 1% by mass to 10% by mass.

The positive electrode current collector used in the invention has the function of collecting current from the positive electrode active material layer. Examples of the material used to form the positive electrode current collector include aluminum, Stainless Used Steel (SUS), nickel, iron, and titanium. Aluminum and SUS are preferable materials among them. The positive electrode current collector may be in they form of a foil, a plate, or a mesh. It is preferable that the positive electrode current collector should be in the form of a foil.

It is preferable to use the solid electrolyte as the positive electrode electrolyte of the positive electrode body used in the invention. More specifically, it is possible to use, for example, a solid oxide electrolyte and a solid sulfide electrolyte, as the solid electrolyte. Examples of the solid oxide electrolyte include LiPON (lithium phosphate oxynitride), $Li_{1.3}Al_{0.3}Ti_{0.7}(PO_4)_3$, $La_{0.51}Li_{0.34}TiO_{0.74}$, $Li_3PO_4$, $Li_2SiO_2$, and $Li_2SiO_4$. Examples of the solid sulfide electrolyte include $Li_2S$—$P_2S_5$ ($Li_2S$: $P_2S_5$=50:50 to 100:0), $Li_2S$—$SiS_2$, $Li_{3.25}P_{0.25}Ge_{0.76}S_4$, $Li_2O$—$Li_2S$—$P_2S_5$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$-ZmSn (Z=Ge, Zn, Ga), $Li_2S$—$GeS_2$, $Li_2S$—$SiS_2$—$Li_3PO_4$, and $Li_2S$—$SiS_2$—$Li_xMO_y$ (M=P, Si, Ge, B, Al, Ga, In). It is also possible to use, for example, a polymer electrolyte and a gel electrolyte described later, as the positive electrode electrolyte of the positive electrode body used in the invention.

A method of producing the positive electrode body used in the invention is not limited to a specific method, as long as the above-described positive electrode body is produced using the method. As a method of producing the positive electrode body that has the composition distribution in which the local content ratio ($W_e$ (partial)/$W_a$ (partial)) intermittently increases from the solid electrolyte interface toward the current collector interface in the thickness direction of the positive electrode active material layer, it is possible to employ, for example, a method in which a plurality of ink layers are formed by applying a plurality of kinds of ink for forming the positive electrode active material layer, which have different mass ratios of the positive electrode electrolyte; and a method in which a plurality of ink layers are formed using a plurality of kinds of ink for forming the positive electrode active material layer, which have different mass ratios of the positive electrode electrolyte by, for example, chemical vapor deposition (CVD), or physical vapor deposition (PVD). As a method of producing the positive electrode body that has the composition distribution in which the local content ratio ($W_e$ (partial)/$W_a$ (partial)) continuously increases from the solid electrolyte interface toward the current collector interface in the thickness direction of the positive electrode active material layer, it is possible to employ, for example, a method in which a composite layer, in which the positive electrode active material and the positive electrode electrolyte are uniformly mixed, is applied on an appropriate substrate, and then, the composition of the composite layer is changed so that the amount of the positive electrode active material is large at the interface at which the composite layer is applied using a centrifugal force, and then, the composite layer is transferred to the current collector (for example, an aluminum foil). After the positive electrode active material layer is formed, the positive electrode active material layer may be pressed to improve the electrode density.

The negative electrode active material used in the negative electrode active material layer is not limited to a specific material, as long as the material stores and discharges metal ions. Examples of the negative electrode active material include alkali metals such as lithium, sodium, and potassium; Group 2 elements such as magnesium and calcium; Group 13 elements such as aluminum; transition metals such as zinc, iron, copper, and nickel; and alloys and compounds containing these metals. Examples of the negative electrode active material containing a lithium element include lithium compounds such as metal lithium, lithium titanate ($Li_4Ti_5O_{12}$), metal alloys such as $Li_3Ni_2Sn_7$, metal oxides, metal sulfides, metal nitrides, and carbon materials such as graphite. The negative electrode active material may be in the form of powder or a thin film.

The negative electrode active material layer may contain, for example, a conducting material and a binding material as required. The above-described conducting material and the above-described binding material may be used as the conducting material and the binding material in the negative electrode active material layer. It is preferable that the amount of the used binding material and the amount of the used conducting material should be appropriately set according to applications for which the negative electrode active material layer is used, for example, the all-solid secondary battery. The thickness of the negative electrode active material layer is not limited to a specific thickness. However, the thickness of the negative electrode active material layer is preferably in a range of 10 µm to 100 µm, and more preferably in a range of 10 µm to 50 µm. It is preferable to use the solid electrolyte as the negative electrode electrolyte of the negative electrode body used in the invention. More specifically, as the solid electrolyte, it is possible to use the solid oxide electrolyte and the solid sulfide electrolyte described above. In addition to the above-described solid oxide electrolyte and the solid sulfide electrolyte, for example, the polymer electrolyte and the gel electrolyte may be used as the negative electrode electrolyte of the negative electrode body used in the invention.

As the material and shape of the negative electrode current collector, it is possible to employ the same materials and shapes as the materials and shapes that may be employed when the positive electrode current collector is produced. As the method of producing the negative electrode body used in the invention, it is possible to employ the same methods as the methods that may be employed when the positive electrode body is produced.

1-2. Solid Electrolyte

It is preferable that the solid electrolyte used in the invention should be a metal ion-exchange solid electrolyte through which metal ions move between the above-described positive electrode active material and the above-described negative electrode active material. Examples of the solid electrolyte include the solid oxide electrolyte, the solid sulfide electrolyte, the polymer electrolyte, and the gel electrolyte.

The polymer electrolyte contains a lithium salt and a polymer. The lithium salt is not limited to a specific lithium salt, as long as the lithium salt is used in an ordinary lithium secondary battery. Examples of the lithium salt include $LiPF_6$, $LiBF_4$, $LiN(CF_3SO_2)_2$, $LiCF_3SO_3$, $LiC_4F_9SO_3$, $LiC(CF_3SO_2)_3$, and $LiClO_4$. The polymer is not limited to a specific polymer, as long as the polymer and the lithium salt form a complex. Examples of the polymer include polyethylene oxide.

The gel electrolyte contains the lithium salt, the polymer, and a nonaqueous solvent. As the lithium salt, it is possible to use the above-described examples of the lithium salt. The nonaqueous solvent is not limited to a specific nonaqueous solvent, as long as the lithium salt is dissolved in the nonaqueous solvent. Examples of the nonaqueous solvent include propylene carbonate, ethylene carbonate, diethyl carbonate, dimethyl carbonate, ethyl methyl carbonate, 1,2-dimethoxyethane, 1,2-diethoxyethane, acetonitrile, propionitrile, tetrahydrofuran, 2-methyltetrahydrofuran, dioxane, 1,3-dioxolane, nitromethane, N,N-dimethylformamide, dimethylsulfoxide, sulfolane, and γ-butyrolactone. One of the above-described nonaqueous solvents may be used, or a mixture of two or more of the above-described nonaqueous solvents may be used. Also, it is possible to use ambient temperature molten salts, as the nonaqueous electrolytic solution. The polymer is not limited to a specific polymer, as long as the polymer can be gelated. Examples of the polymer include polyethylene oxide, polypropylene oxide, polyacrylonitrile, polyvinylidene fluoride (PVDF), polyurethane, polyacrylate, and cellulose.

As the method of producing the electrolyte layer, it is possible to employ a method in which the solid electrolyte is pressed. Also, the electrolyte layer may be produced by applying slurry produced by mixing the above-described solid electrolyte with the solvent, to an intended portion such as the positive electrode body or the negative electrode body.

1-3. Other Components

The separator may be used in the first all-solid secondary battery according to the invention, as the other component. The separator is disposed between the positive electrode current collector and the negative electrode current collector. In general, the separator has the function of preventing contact between the positive electrode active material layer and the negative electrode active material layer, and holding the solid electrolyte. Examples of the material used to form the separator include resins such as polyethylene (PE), polypropylene (PP), polyester, cellulose, and polyamide. Among them, polyethylene and polypropylene are preferable. The separator may have a single-layer structure or a plural-layer structure. Examples of the separator with the plural-layer structure include a separator with a two-layer structure, which includes a PE layer and a PP layer, and a separator with a three-layer structure, which includes a PP layer, a PE layer, and a PP layer. Further, in the invention, the separator may be made of nonwoven cloth such as resin nonwoven cloth and glass fiber nonwoven cloth. The thickness of the separator is not limited to a specific thickness. In general, the thickness of the separator is similar to the thickness of a separator used in an ordinary all-solid secondary battery. A battery case, in which the first all-solid secondary battery according to the invention is housed, may be used as the other component. The shape of the battery case is not limited to a specific shape, as long as the positive electrode body, the negative electrode body, the solid electrolyte, and the like are housed in the battery case. Examples of the shape of the battery case include a cylindrical shape, an angular shape, a coin shape, and a laminate shaped.

The first all-solid secondary battery according to the invention may be produced by a method similar to a method of producing an ordinary all-solid secondary battery. More specifically, for example, under an inert atmosphere, first, the positive electrode body, the negative electrode body, and the separator are housed in the battery case, and then, the solid electrolyte is supplied to the battery case, and finally, the battery case is sealed.

2. Second All-Solid Secondary Battery

A second all-solid secondary battery according to the invention includes a positive electrode body including a positive electrode current collector and a positive electrode active material layer that contains at least a positive electrode active material and a positive electrode electrolyte, and that is formed on the positive electrode current collector; a negative electrode body including a negative electrode current collector and a negative electrode active material layer that contains at least a negative electrode active material and a negative electrode electrolyte, and that is formed on the negative electrode current collector; and a solid electrolyte that is held between the positive electrode body and the negative electrode body. The electrode active material layer of at least one of the positive electrode body and the negative electrode body has a composition distribution in which a local content ratio, which is represented by a ratio ($V_e$ (partial)/$V_a$ (partial)) of a volume ($V_e$ (partial)) of the electrolyte contained in a portion of the electrode active material layer to a volume ($V_a$ (partial)) of the active material contained in the portion of the electrode active material layer, increases from a solid electrolyte interface toward a current collector interface in the thickness direction of the electrode active material layer.

In the second all-solid secondary battery according to the invention, it is preferable that, in the electrode active material layer of at least one of the positive electrode body and the negative electrode body, a porosity should increase from the current collector interface toward the solid electrolyte interface in the thickness direction of the electrode active material layer so that pores absorb expansion and contraction of the active material due to movement of metal ions. The expansion and contraction of the active material are prominent particularly in the solid electrolyte interface side.

The words "the all-solid secondary battery", "the solid electrolyte", and "the composition distribution in which the local content ratio increases from the solid electrolyte interface toward the current collector interface" have the same meanings as those described in the description of the first all-solid secondary battery. The phrase "the porosity increases from the current collector interface toward the solid electrolyte interface" will be described more specifically. When the porosities at two different portions of the electrode active material layer are compared to each other, the porosity at one of the two portions, which is closer to the solid electrolyte than the other portion is, is higher than the porosity at the other portion, which is closer to the current collector than the one portion is. In this case, the porosity may continuously increase, for example, the porosity may increase in an inclined manner or may linearly increase. Also, the porosity may intermittently increase, for example, the local content ratio may increase in a stepwise manner.

Figure 10:
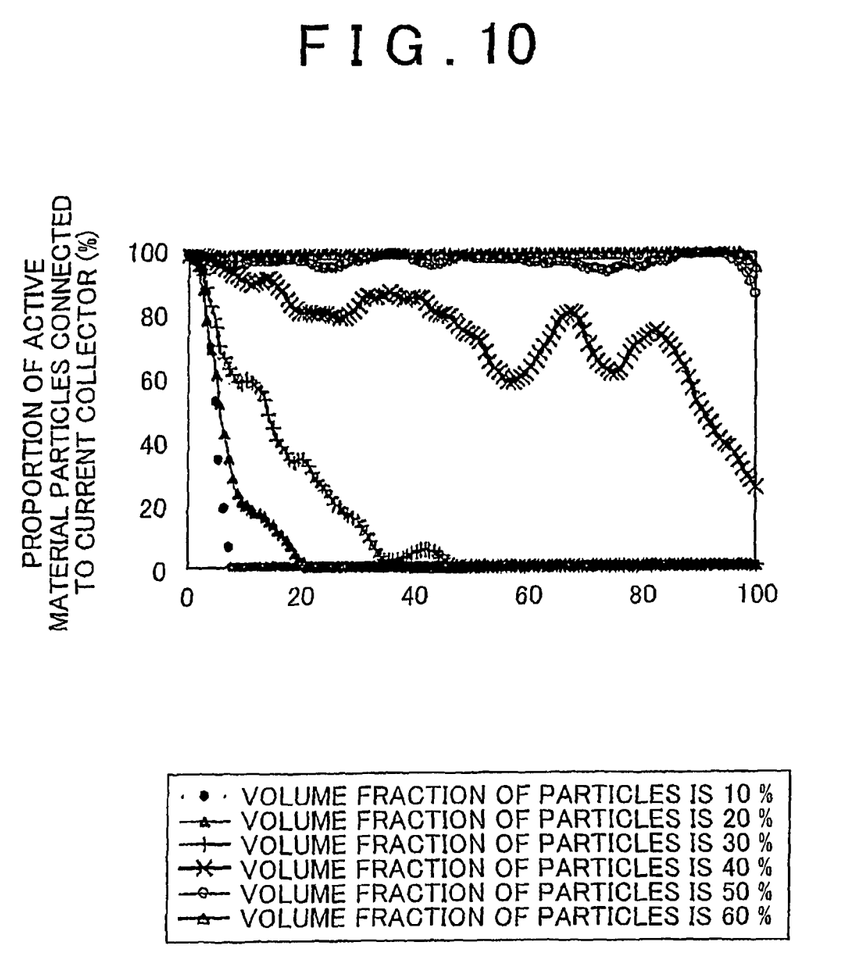
FIG. 10 is a graph showing results of evaluation on the proportion of connected active material particles according to the percolation theory.

A vehicle-mounted battery for a hybrid vehicle or an electric vehicle is required to have high capacity and to produce high output. Conventionally, the thickness of the electrode active material layer is increased to increase the capacity of the battery. In the conventional case, however, resistance is increased due to the increase in the thickness of the electrode active material layer, and as a result, the output characteristic is decreased. FIG. 10 is a graph showing results of evaluation on the proportion of the connected positive electrode active material particles according to the percolation theory. In the graph, an ordinate axis indicates the proportion (%) of the active material particles connected to the current collector, and an abscissa axis indicates the thickness (%) of the positive electrode active material layer from the current collector. In the graph, six cases, in which the volume fraction of the positive electrode active material particles is 10% to 60%, are plotted. The word "the proportion of the connected active material particles" signifies the proportion of the active material particles that are continuously connected from the current collector to each predetermined thickness. The word "the volume fraction of the active material particles" signifies the proportion of the volume of the active material particles in a unit volume, which is expressed in terms of percent. The value of the volume fraction of the active material particles is equal to a value obtained by subtracting the value of the porosity in the electrode active material layer from 100%. As shown in FIG. 10, the proportion of the active material particles connected from the current collector decreases as the thickness (%) of the electrode active material layer from the current collector increases, regardless of the volume fraction of the active material particles. It is considered that, as a result of this phenomenon, the resistance of the electrode active material layer is increased, or the capacity is decreased due to disconnection of the electrode active material particles. Thus, it is estimated that a high-rate characteristic deteriorates when the thickness of the electrode active material layer is increased, because of this phenomenon.

Figure 11:
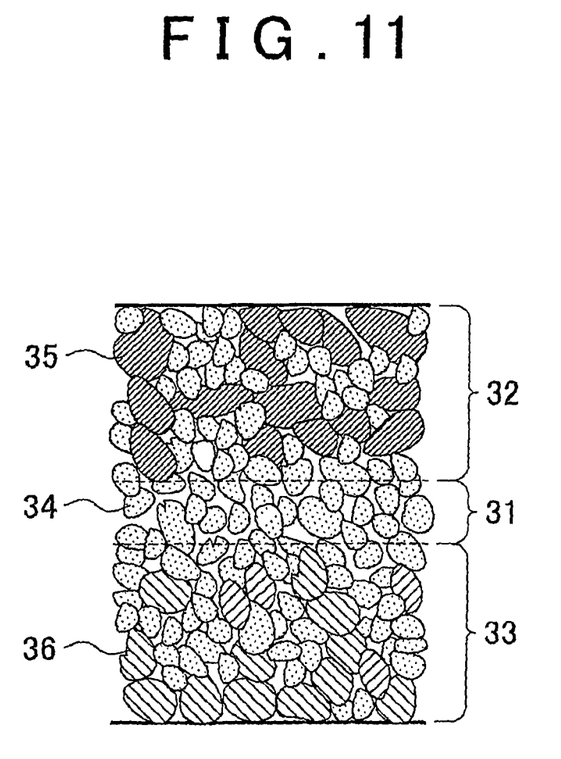
FIG. 11 is a diagram schematically showing a section of a laminated body that is a portion of an all-solid secondary battery in related art, the section being taken along a stacking direction.

FIG. 11 is a diagram schematically showing a section of a laminated body that is a portion of a conventional all-solid secondary battery, the section being taken along the stacking direction. In the laminated body, a solid electrolyte layer 31 including a solid electrolyte 34 is held between a pair of a positive electrode body and a negative electrode body. In general, the positive electrode body includes a positive electrode active material layer 32 that contains a positive electrode active material 35. A solid electrolyte 34 is mixed into the positive electrode active material layer 32 as required. The negative electrode body includes a negative electrode active material layer 33 that contains a negative electrode active material 36. The solid electrolyte 34 is mixed into the negative electrode active material layer 33 as required. Thus, in the all-solid secondary battery that includes the electrode active material layer in which the content ratio between the solid electrolyte and the electrode active material is uniform, when the thickness of the electrode active material layer is increased to improve the high-rate discharge characteristic, the proportion of the active material particles connected from the current collector interface decreases, and the proportion of the electrolyte particles connected from the solid electrolyte layer interface decreases in the electrode active material layer. As a result, a conductive path may be interrupted, and a metal ion conduction path may be interrupted.

As shown in FIG. 10, as the volume fraction of the active material particles increases, the proportion of the active material particles connected from the current collector increases. Accordingly, when a local content ratio, which is represented by a ratio ($V_a$ (partial)/$V_e$ (partial)) of the volume ($V_a$ (partial)) of the active material contained in a portion of the electrode active material layer to the volume ($V_e$ (partial)) of the electrolyte contained in the portion of the electrode active material layer, increases from the current collector interface toward the solid electrolyte interface in the thickness direction of the electrode active material layer, it is possible to ensure the sufficient proportion of the connected active material particles, and therefore, to suppress the increase in the resistance due to the interruption of the conductive path.

When adjusting the volume ratio in the above-described manner, the local content ratio, which is represented by the ratio ($V_e$ (partial)/$V_a$ (partial)) of the volume ($V_e$ (partial)) of the electrolyte contained in a portion of the electrode active material layer to the volume ($V_a$ (partial)) of the active material contained in the portion of the electrode active material layer, increases from the solid electrolyte interface toward the current collector interface in the thickness direction of the electrode active material layer. As a result, it is possible to ensure the sufficient proportion of the connected electrolyte particles, and therefore, to suppress the increase in the resistance due to the interruption of the metal ion conduction path.

Figure 4:
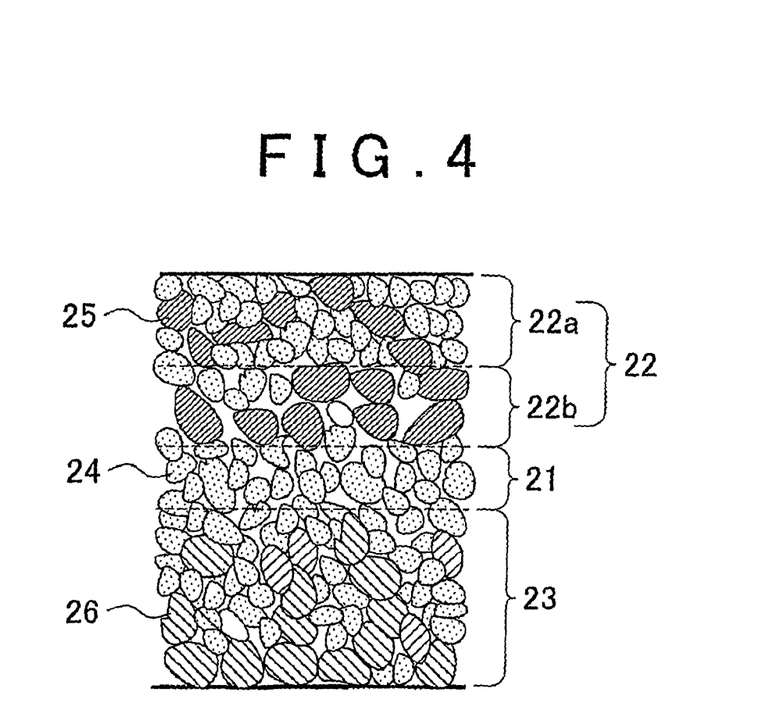
FIG. 4 is a diagram schematically showing a section of a laminated body that is a portion of a typical example of a second all-solid secondary battery according to the invention, the section being taken along the stacking direction.

FIG. 4 is a diagram schematically showing a section of a laminated body that is a portion of a typical example of the second all-solid secondary battery according to the invention, the section being taken along the stacking direction. In the laminated body, a solid electrolyte layer 21 including a solid electrolyte 24 is held between a pair of a positive electrode body and a negative electrode body. A positive electrode active material layer 22, which is generally used as the positive electrode body, includes a first positive electrode active material layer 22a and a second positive electrode active material layer 22b. In the positive electrode active material layer 22, the first positive electrode active material layer 22a is disposed closer to the current collector than the second positive electrode active material layer 22b is. Thus, the second positive electrode active material layer 22b is disposed closer to the solid electrolyte layer 21 than the first positive electrode active material layer 22a is. Each of the positive electrode active material layers 22a and 22b contains a positive electrode active material 25 and the solid electrolyte 24. A local content ratio "a1" ($V_e$ (partial)/$V_a$ (partial)) in the first positive electrode active material layer 22a is larger than a local content ratio "a2" in the second positive electrode active material layer 22b (a1>a2). A porosity "b1" in the first positive electrode active material layer 22a is lower than a porosity "b2" in the second positive electrode active material layer 22b (b1<b2). That is, the local content ratio, which is represented by the volume ratio of the solid electrolyte 24 in the first positive electrode active material layer 22a, is larger than the local content ratio, which is represented by the volume ratio of the solid electrolyte 24 in the second positive electrode active material layer 22b. In addition, the porosity in the first positive electrode active material layer 22a is lower than the porosity in the second positive electrode active material layer 22b. Also, the second all-solid secondary battery includes a negative electrode active material layer 23 that is used as the negative electrode body, and that contains a negative electrode active material 26. The solid electrolyte 24 is mixed into the negative electrode active material layer 23 as required.

Thus, in the positive electrode active material layer, the local content ratio ($V_e$ (partial)/$V_a$ (partial)) increases from the solid electrolyte interface toward the current collector interface in the thickness direction of the electrode active material layer. As a result, when the thickness of the electrode active material layer is increased to improve the high-rate discharge characteristic, it is possible to reduce the possibility that the proportion of the active material particles connected from the current collector interface decreases, and to reduce the possibility that the proportion of the electrolyte particles connected from the solid electrolyte interface decreases. Accordingly, it is possible to reduce the possibility that the conductive path is interrupted, and to reduce the possibility that the metal ion conduction path is interrupted. Also, because the porosity increases from the current collector interface toward the solid electrolyte interface in the thickness direction of the electrode active material layer, the pores absorb the expansion and contraction of the active material, which are prominent particularly in the solid electrolyte interface side. That is, because the active material expands into the pores, it is possible to reduce the possibility that the electrode active material layer expands and contracts.

In the second all-solid secondary battery according to an embodiment of the invention, the thickness of the electrode active material layer of at least one of the positive electrode body and the negative electrode body is 1 to 300 µm. If the thickness of the electrode active material layer is smaller than 1 µm, sufficient capacity cannot be obtained. If the thickness of the electrode active material layer is larger than 300 µm, the resistance excessively increases, and thus, the output characteristic deteriorates. The thickness of the electrode active material layer of at least one of the positive electrode body and the negative electrode body is preferably 20 µm to 200 µm.

As the material that constitutes the electrode body, it is possible to use the same materials as those described in the above section "1-1. Positive electrode and negative electrode". A method of producing the electrode body used in the invention is not limited to a specific method, as long as the above-described electrode body is produced. As a method of producing the electrode body that has the composition distribution in which the local content ratio ($V_e$ (partial)/$V_a$ (partial)) intermittently increases from the solid electrolyte interface toward the current collector interface in the thickness direction of the electrode active material layer, it is possible to employ, for example, a method in which a plurality of ink layers are formed by applying a plurality of kinds of ink for forming the electrode active material layer, which have different volume ratios of the electrode electrolyte; and a method in which a plurality of ink layers are formed using a plurality of kinds of ink for forming the electrode active material layer, which have different volume ratios of the electrode electrolyte by, for example, chemical vapor deposition (CVD), or physical vapor deposition (PVD). In this case, slurry, which is produced by mixing the ink for forming the electrode active material layer with a solvent, may be used. As a method of producing the electrode body that has the composition distribution in which the local content ratio ($V_e$ (partial)/$V_a$ (partial)) continuously increases from the solid electrolyte interface toward the current collector interface in the thickness direction of the electrode active material layer, it is possible to employ, for example, a method in which a composite layer, in which the electrode active material and the electrode electrolyte are uniformly mixed, is applied on an appropriate substrate, and then, the composition of the composite layer is changed so that the amount of the electrode active material is large at the interface at which the composite layer is applied using a centrifugal force, and then, the composite layer is transferred to the current collector (for example, an aluminum foil). After the electrode active material layer is formed, the electrode active material layer may be pressed to improve the electrode density. The pressing pressure is preferably 4.0 ton/cm$^2$.

By using the composite material in which the local content ratio varies, the positive electrode active material layer is formed so that the ratio of the positive electrode active material and the porosity increase from the current collector side to the solid electrolyte side. The porosity is preferably 0.05% to 40%, and more preferably 0.1% to 20%. As a method of forming the positive electrode active material layer with a desired porosity, it is possible to employ, for example, a method in which the pressing pressure is changed to a desired value when the composite material is pressed to shape the composite material, and a method in which a temperature applied to the composite material is changed to a desired value when the composite material is pressed to shape the composite material. In a method of evaluating the porosity in the battery, first, a piece with a desired size is cut out from the battery, and the active material layer is ground using Focused Ion Beam (FIB). Then, the battery piece, whose section has been formed by grinding, is observed by Scanning Electron Microscope (SEM), or by Scanning Ion Microscopy (SIM). When the pores are seen in an image during observation, the proportion of the pores in a visual field is calculated. Then, the average of the proportions of the pores in a plurality of visual fields is determined as the porosity, and the porosity is evaluated.

As the material used to form the solid electrolyte layer, the same materials as those described in the above "1-2. Solid electrolyte" may be used. The solid electrolyte may include a compact formed by pressing powder.

As the other components such as the separator and the battery case, the same components as those described in the above "1-3. Other components" may be used. The entire second all-solid secondary battery according to the invention may be compressed using a press machine, before the second all-solid secondary battery is housed in the battery case.

EXAMPLES

1. Simulation on an Overpotential for Lithium Ion Conduction

In examples described below, simulation on an overpotential for lithium ion conduction in the positive electrode active material layer will be described. The following calculation conditions for the simulation are set. First, components of the positive electrode active material layer are the positive electrode electrolyte, the positive electrode active material, and the conductive auxiliary agent. The proportion of the total content of the conductive auxiliary agent in the positive electrode active material layer is 10% by mass, and the conductive auxiliary agent is uniformly distributed in the positive electrode active material layer. Accordingly, the proportion of the total content of the positive electrode electrolyte and the positive electrode active material in the positive electrode active material layer is 90% by mass. Then, a positive electrode electrolyte distribution function is set. The positive electrode electrolyte distribution function is a function used to set the distribution of the positive electrode electrolyte in the positive electrode active material layer in the thickness direction thereof. In the examples, $a+bX^n$ is employed as the function. In the function, X indicates a coordinate in the thickness direction of the positive electrode active material layer. X is 0 (X=0) at the current collector interface of the positive electrode active material layer. X is 1 (X=1) at the solid electrolyte interface of the positive electrode active material layer. In the function, "n" is an order used to set a function curve of the positive electrode electrolyte distribution function, and "a" and "b" are initial values. Particularly, "a" represents the proportion of the content of the positive electrode electrolyte at the current collector interface (X=0) of the positive electrode active material layer, and "a" is larger than 0, and equal to or smaller than 90 ($0<a\leq 90$). The positive electrode electrolyte was set to $Li_2S$—$P_2S_5$ that is a solid electrolyte. The resistance of the electrolyte was set to $1E3$ $\Omega\cdot m$ that is the highest level among resistances of existing solid electrolytes. The positive electrode active material was set to $LiNiO_2$. Calculation models in first to third examples, and first to sixth comparative examples were produced by setting different calculation conditions described below in addition to the above-described calculation conditions, and the simulation was performed.

First Example

The proportion of the total content of the positive electrode electrolyte in the positive electrode active material layer was set to 60% by mass, the proportion of the total content of the positive electrode active material in the positive electrode active material layer was set to 30% by mass, and the value of "n" was set to 1.

Second Example

The proportion of the total content of the positive electrode electrolyte in the positive electrode active material layer was set to 60% by mass, the proportion of the total content of the positive electrode active material in the positive electrode active material layer was set to 30% by mass, and the value of "n" was set to 0.75.

Third Example

The proportion of the total content of the positive electrode electrolyte in the positive electrode active material layer was set to 60% by mass, the proportion of the total content of the positive electrode active material in the positive electrode active material layer was set to 30% by mass, and the value of "n" was set to 0.5.

First Comparative Example

The proportion of the total content of the positive electrode electrolyte in the positive electrode active material layer was set to 45% by mass, the proportion of the total content of the positive electrode active material in the positive electrode active material layer was set to 45% by mass, and the value of "n" was set to 1.5.

Second Comparative Example

The proportion of the total content of the positive electrode electrolyte in the positive electrode active material layer was set to 45% by mass, the proportion of the total content of the positive electrode active material in the positive electrode active material layer was set to 45% by mass, and the value of "n" was set to 1.

Third Comparative Example

The proportion of the total content of the positive electrode electrolyte in the positive electrode active material layer was set to 45% by mass, the proportion of the total content of the positive electrode active material in the positive electrode active material layer was set to 45% by mass, and the value of "n" was set to 0.5.

Fourth Comparative Example

The proportion of the total content of the positive electrode electrolyte in the positive electrode active material layer was set to 36% by mass, the proportion of the total content of the positive electrode active material in the positive electrode active material layer was set to 54% by mass, and the value of "n" was set to 1.5.

Fifth Comparative Example

The proportion of the total content of the positive electrode electrolyte in the positive electrode active material layer was set to 36% by mass, the proportion of the total content of the positive electrode active material in the positive electrode active material layer was set to 54% by mass, and the value of "n" was set to 1.

Sixth Comparative Example

The proportion of the total content of the positive electrode electrolyte in the positive electrode active material layer was set to 36% by mass, the proportion of the total content of the positive electrode active material in the positive electrode active material layer was set to 54% by mass, and the value of "n" was set to 0.5.

Figure 3:
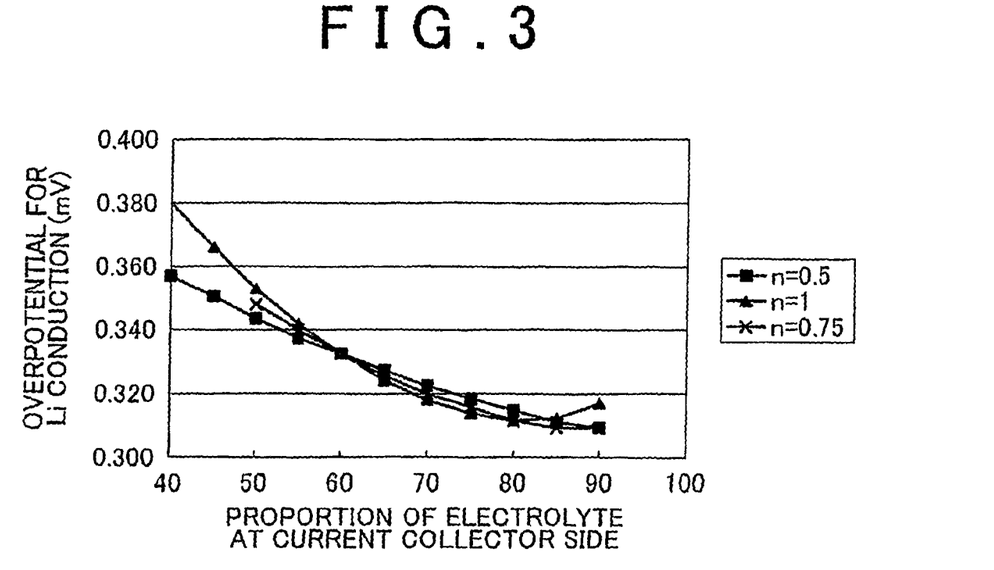
FIG. 3 is a graph showing simulation results in first to third examples.
Figure 8:
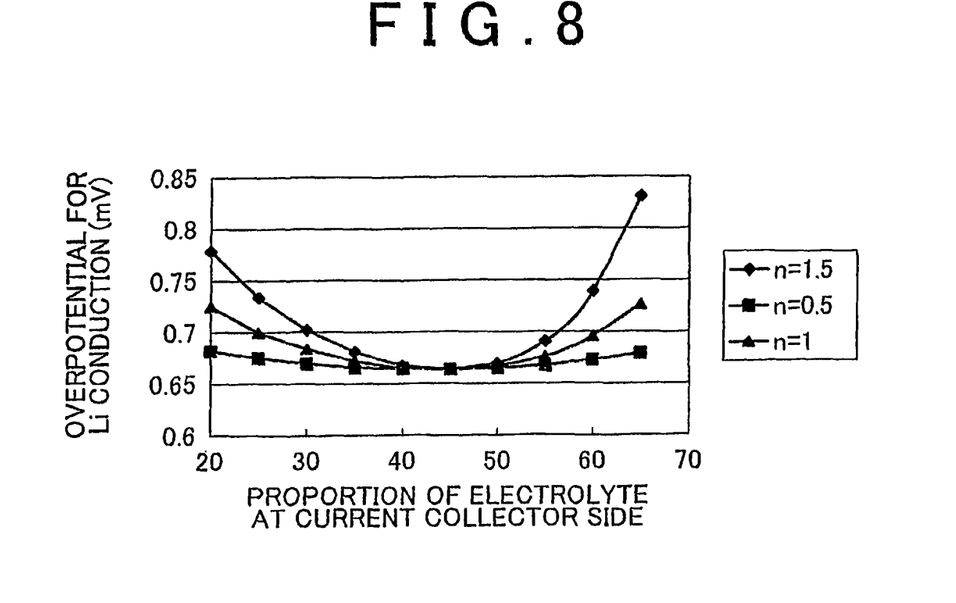
FIG. 8 is a graph showing simulation results in first to third comparative examples.
Figure 9:
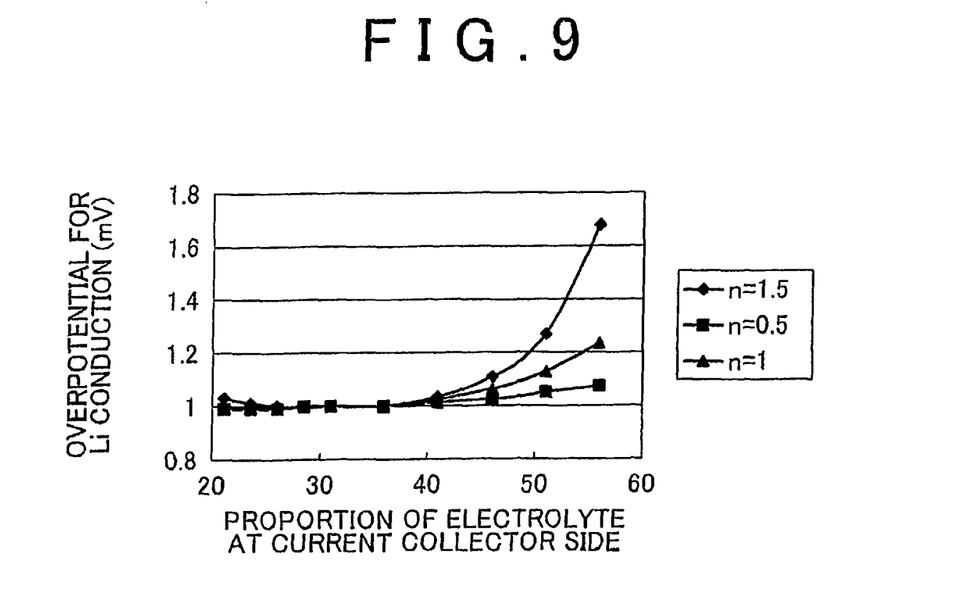
FIG. 9 is a graph showing simulation results in fourth to sixth comparative examples.

FIG. 3 shows simulation results in the first to third examples, FIG. 8 shows simulation results in first to third comparative examples, and FIG. 9 shows simulation results in fourth to sixth comparative examples. An ordinate axis indicates an overpotential (mV) for lithium ion conduction, and an abscissa axis indicates the proportion "a" of the content of the positive electrode electrolyte at the current collector interface (X=0) of the positive electrode active material layer.

Hereinafter, the simulation results in FIG. 3, FIG. 8, and FIG. 9 will be compared to each other. As evident from comparison between the ordinate axes of graphs in FIG. 3, FIG. 8, and FIG. 9, in all the cases where the proportion of the total content of the positive electrode electrolyte in the positive electrode active material layer is higher than the proportion of the total content of the positive electrode active material in the positive electrode active material layer (i.e., in the first to third examples), the overpotential for lithium ion conduction is low, as compared to the cases where the proportion of the total content of the positive electrode electrolyte in the positive electrode active material layer is equal to the proportion of the total content of the positive electrode active material in the positive electrode active material layer (i.e., the first to third comparative examples), and the cases where the proportion of the total content of the positive electrode electrolyte in the positive electrode active material layer is lower than the proportion of the total content of the positive electrode active material in the positive electrode active material layer (i.e., the fourth to sixth comparative examples). This shows that when the amount of the positive electrode electrolyte contained in the positive electrode active material layer is larger than the amount of the positive electrode active material contained in the positive electrode active material layer, the overpotential is reduced, because the ion conductivity of $Li_2S—P_2S_5$, which is the solid electrolyte, is lower than the ion conductivity of a liquid electrolyte.

In FIG. 8, in the calculation model in each of the first to third comparative examples, when "a" is 45 (and "b" is 0) (i.e., a=45 (and b=0)), that is, when the positive electrode electrolyte is uniformly contained in the positive electrode active material layer, the overpotential is lowest. Further, in FIG. 9 (that shows the fourth to sixth comparative examples), in the calculation model in each of the fourth to sixth comparative examples, when "a" is 36 (and "b" is 0) (i.e., a=36 (and b=0)), that is, when the positive electrode electrolyte is uniformly contained in the positive electrode active material layer, the overpotential is lowest. However, in FIG. 3 (that shows the first to third examples), in the calculation model in each of the first to third examples, when "a" is 60 (i.e., a>60), that is, when the proportion of the content of the positive electrode electrolyte at the current collector interface is higher than 60% by mass, and the proportion of the content of the positive electrode electrolyte at the solid electrolyte interface is lower than 60% by mass, the overpotential is lowest. More specifically, in the first example, when "a" is 80 (i.e., a=80), the overpotential is lowest. In each of the second and third examples, when "a" is 90 (i.e., a=90), the overpotential is lowest. The results of the above-described comparison show that in the cases where the proportion of the total content of the positive electrode electrolyte in the positive electrode active material layer is equal to the proportion of the total content of the positive electrode active material in the positive electrode active material layer (i.e., in the first to third comparative examples), and in the cases where the proportion of the total content of the positive electrode electrolyte in the positive electrode active material layer is lower than the proportion of the total content of the positive electrode active material in the positive electrode active material layer (i.e., in the fourth to sixth comparative examples), when the positive electrode electrolyte is uniformly contained in the positive electrode active material layer, the overpotential is lowest. Accordingly, in these cases, it is not necessary to set the composition distribution in which the local content ratio ($W_e$ (partial)/$W_a$ (partial)) increases from the solid electrolyte interface toward the current collector interface in the thickness direction of the positive electrode active material layer, as in the invention. In the cases where the proportion of the total content of the positive electrode electrolyte in the positive electrode active material layer is higher than the proportion of the total content of the positive electrode active material in the positive electrode active material layer (i.e., in the first to third examples), the overpotential is lowest when the positive electrode active material layer has the composition distribution in which the local content ratio ($W_e$ (partial)/$W_a$ (partial)) increases from the solid electrolyte interface toward the current collector interface in the thickness direction of the positive electrode active material layer.

2. Experiment for Evaluation on Electric Discharge Characteristic 2-1. Production of All-Solid Secondary Battery

Fourth Example

An all-solid lithium secondary battery, which is one of all-solid secondary batteries, was produced. First, each of two kinds of source materials for the positive electrode active material layer was prepared by mixing the positive electrode active material with the solid electrolyte. The two kinds of source materials have different volume ratios between the positive electrode active material and the solid electrolyte. At this time, as the positive electrode active material, lithium cobaltate ($LiCoO_2$), which is one of lithium compounds, was used. As the solid electrolyte, $Li_2S—P_2S_5$, which is one of sulfide solid electrolytes, was used. Then, each of the two different source materials for the positive electrode active material layer was pressed. Thus, the positive electrode active material layers, which have different volume ratios between the positive electrode active material and the solid electrolyte, were produced. Further, the two active material layers were attached to each other, and pressed to integrate the two active material layers. Subsequently, the solid electrolyte was applied to one surface of the active material layer, in which the volume ratio ($V_a$ (partial)/$V_e$ (partial)) of the positive electrode active material is high, to produce a laminated body. Then, the laminated body was pressed to produce the solid electrolyte layer. As the solid electrolyte, $Li_2S—P_2S_5$, which is one of sulfide solid electrolytes, was used. Further, a source material for the negative electrode active material layer, which was prepared by mixing the negative electrode active material with the solid electrolyte, was applied to the solid electrolyte layer side of the laminated body including the solid electrolyte layer and the positive electrode active material layer. Then, the laminated body was pressed at 4.0 ton/$cm^2$ to produce the negative electrode active material layer. At this time, as the negative electrode active material, lithium titanate ($Li_4Ti_5O_{12}$) was used. As the solid electrolyte, $Li_2S—$ $P_2S_5$, which is one of sulfide solid electrolytes, was used. Finally, the laminated body, which includes the negative electrode active material layer, the solid electrolyte layer, and the positive electrode active material layer, was held between SUS foil current collectors. Then, the entire battery was compressed using a press machine, and thus, the all-solid lithium secondary battery in the fourth example was completed.

Seventh Comparative Example

When the positive electrode active material layer in the seventh comparative example was produced, first, only one kind of source material for the positive electrode active material layer was prepared by mixing the positive electrode active material with the solid electrolyte. The positive electrode active material and the solid electrolyte are the same as those in the fourth example. Then, the positive electrode active material layer, in which the volume ratio between the positive electrode active material and the solid electrolyte was substantially uniform, was produced by pressing the source material for the positive electrode active material layer. Then, the solid electrolyte layer, the negative electrode active material layer, and the current collector were produced in the same manner as in the fourth example. Thus, the all-solid lithium secondary battery in the seventh comparative example was completed.

2-2. Evaluation on the Porosity in the All-Solid Lithium Secondary Battery

Figure 5:
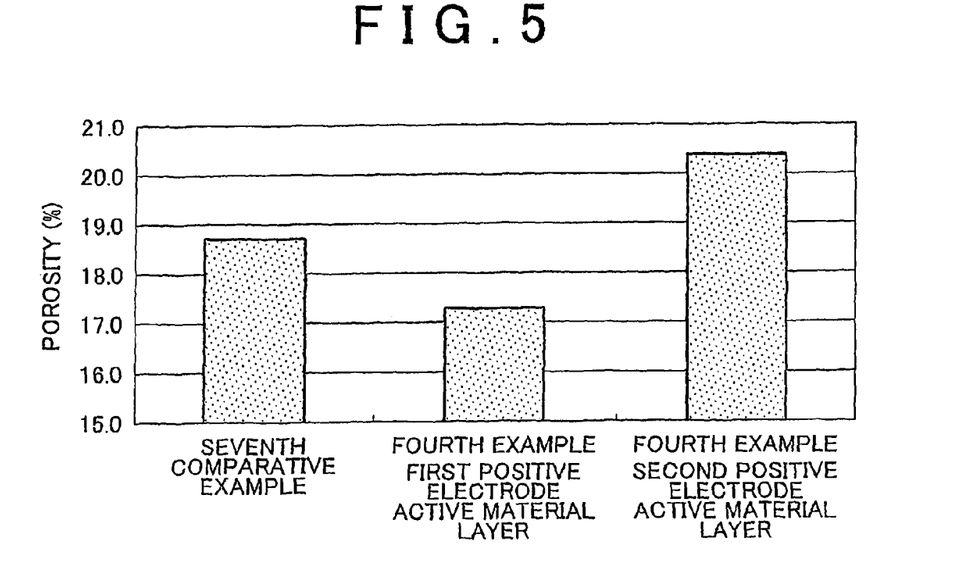
FIG. 5 is a graph showing porosities in positive electrode active material layers in all-solid secondary batteries in a fourth example and a seventh comparative example.

The porosity in the positive electrode active material layer of the all-solid lithium secondary battery in each of the fourth example and the seventh comparative example was evaluated. First, a piece with a desired size was cut out from the battery, and the positive electrode active material layer was ground using Focused Ion Beam (FIB). Then, the battery piece, whose section had been formed by grinding, was observed by Scanning Electron Microscope (SEM). When the pores were seen in an image during observation, the proportion of the pores in a visual field was calculated. Then, the average of the proportions of the pores in a plurality of visual fields was determined as the porosity, and the porosity was evaluated. FIG. 5 is a graph showing the porosity in the positive electrode active material layer in the all-solid lithium secondary battery in each of the fourth example and the seventh comparative example. A bar, which is labeled "Forth example/ First positive electrode active material layer", indicates the porosity in a layer positioned close to the current collector, in the all-solid lithium secondary battery in the fourth example. A bar, which is labeled "Fourth example/Second positive electrode active material layer", indicates the porosity in a layer positioned close to the solid electrolyte, in the all-solid lithium secondary battery in the fourth example. In the seventh comparative example, the thickness of the positive electrode active material layer was 44.7 μm. As shown in FIG. 5, the porosity in the positive electrode active material layer in the seventh comparative example was 18.7%. In contrast, the thickness of the first positive electrode active material layer in the fourth example was 45.5 μm. As shown in FIG. 5, the porosity in the first positive electrode active material layer in the fourth example was 17.3%. The thickness of the second positive electrode active material layer in the fourth example was 43.8 μm. As shown in FIG. 5, the porosity in the second positive electrode active material layer in the fourth example was 20.4%. Thus, it was confirmed that, in the positive electrode active material layer in the battery in the fourth example, the porosity at the solid electrolyte side is higher than the porosity at the current collector side.

Figure 6:
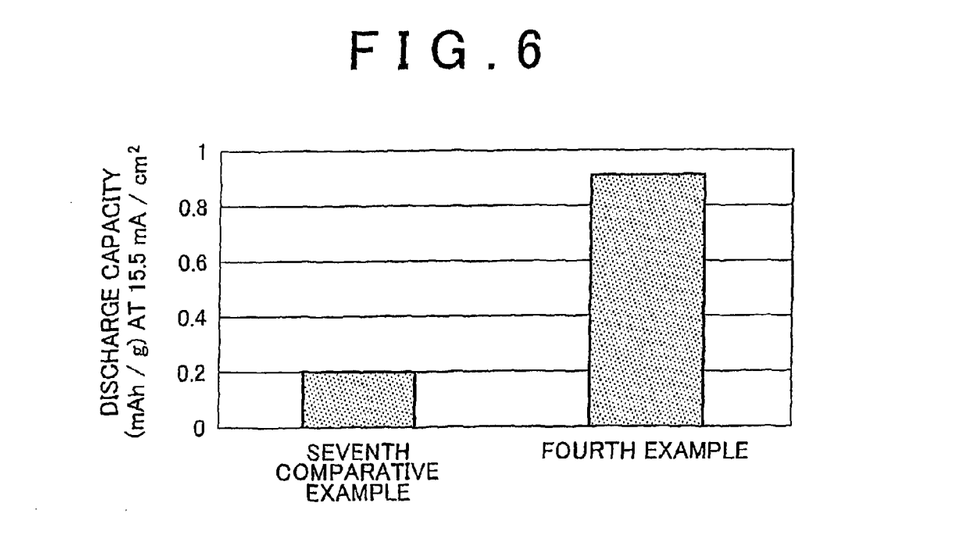
FIG. 6 is a graph showing discharge capacities of all-solid secondary batteries in the fourth example and the seventh comparative example.

2-3. Evaluation on Electric Discharge Characteristic of the All-Solid Lithium Secondary Battery The electric discharge characteristic of the all-solid lithium secondary battery in each of the fourth example and the seventh comparative example was evaluated. First, the all-solid lithium secondary battery in each of the fourth example and the seventh comparative example was left at 25° C. for 2 hours. Then, each battery was charged under the condition of 0.155 mA/cm², and was fully charged. Further, after charging was completed, each battery was left at 60° C. for 2 hours. After each battery was left and the temperature of each battery becomes constant, electric discharge test was conducted under the condition of 15.5 mA/cm² until a lower limit 3V was reached. Thus, the discharge capacity was evaluated. FIG. 6 is a graph showing the discharge capacity of the all-solid lithium secondary battery in each of the fourth example and the seventh comparative example. The discharge capacity of the battery in the seventh comparative example was 0.2 mAh. In contrast, the discharge capacity of the battery in the fourth example was 0.9 mAh. The results show that the discharge characteristic of the all-solid secondary battery according to the invention was 4.5 times as high as that of the all-solid secondary battery in related art.

What is claimed is:

1. An all-solid secondary battery comprising:
a positive electrode body including a positive electrode current collector and a positive electrode active material layer that contains at least a positive electrode active material and a positive electrode electrolyte, and that is formed on the positive electrode current collector;
a negative electrode body including a negative electrode current collector and a negative electrode active material layer that contains at least a negative electrode active material and a negative electrode electrolyte, and that is formed on the negative electrode current collector; and
a solid electrolyte that is held between the positive electrode body and the negative electrode body, wherein
in the electrode active material layer of at least one of the positive electrode body and the negative electrode body, a total content ratio, which is represented by a ratio of mass of the electrolyte contained in the electrode active material layer to mass of the active material contained in the electrode active material layer, is larger than 1; and
the electrode active material layer of the at least one of the positive electrode body and the negative electrode body has a composition distribution in which a local content ratio, which is represented by a ratio of mass of the electrolyte contained in a portion of the electrode active material layer to mass of the active material contained in the portion of the electrode active material layer, increases from a solid electrolyte interface toward a current collector interface in a thickness direction of the electrode active material layer.

2. The all-solid secondary battery according to claim 1, wherein
in at least the positive electrode active material layer of the positive electrode body, the total content ratio is larger than 1, and at least the positive electrode active material layer has the composition distribution in which the local content ratio increases from the solid electrolyte interface toward the current collector interface in the thickness direction of the electrode active material layer.

3. An all-solid secondary battery comprising:
a positive electrode body including a positive electrode current collector and a positive electrode active material layer that contains at least a positive electrode active material and a positive electrode electrolyte, and that is formed on the positive electrode current collector;

a negative electrode body including a negative electrode current collector and a negative electrode active material layer that contains at least a negative electrode active material and a negative electrode electrolyte, and that is formed on the negative electrode current collector; and a solid electrolyte that is held between the positive electrode body and the negative electrode body, wherein the electrode active material layer of at least one of the positive electrode body and the negative electrode body has a composition distribution in which a local content ratio, which is represented by a ratio of a volume of the electrolyte contained in a portion of the electrode active material layer to a volume of the active material contained in the portion of the electrode active material layer, increases from a solid electrolyte interface toward a current collector interface in a thickness direction of the electrode active material layer.

4. The all-solid secondary battery according to claim 3, wherein at least the positive electrode active material layer of the positive electrode body has the composition distribution in which the local content ratio increases from the solid electrolyte interface toward the current collector interface in the thickness direction of the electrode active material layer.

5. The all-solid secondary battery according to claim 3, wherein in the electrode active material layer of at least one of the positive electrode body and the negative electrode body, a porosity increases from the current collector interface toward the solid electrolyte interface in the thickness direction of the electrode active material layer.

6. The all-solid secondary battery according to claim 5, wherein in at least the positive electrode active material layer of the positive electrode body, the porosity increases from the current collector interface toward the solid electrolyte interface in the thickness direction of the electrode active material layer.

7. The all-solid secondary battery according to claim 6, wherein in at least the positive electrode active material layer of the positive electrode body, the porosity is 0.05% to 40%.

8. The all-solid secondary battery according to claim 3, wherein a thickness of the electrode active material layer of at least one of the positive electrode body and the negative electrode body is 1 to 300 μm.

9. The all-solid secondary battery according to claim 8, wherein a thickness of the electrode active material layer of at least one of the positive electrode body and the negative electrode body is 20 to 200 μm.

10. The all-solid secondary battery according to claim 8, wherein a thickness of at least the positive electrode active material layer of the positive electrode body is 1 to 300 μm.

11. The all-solid secondary battery according to claim 9, wherein a thickness of at least the positive electrode active material layer of the positive electrode body is 20 to 200 μm.

12. The all-solid secondary battery according to claim 3, wherein the solid electrolyte includes a compact formed by pressing powder.

* * * * *